United States Patent Office 2,852,066
Patented Sept. 16, 1958

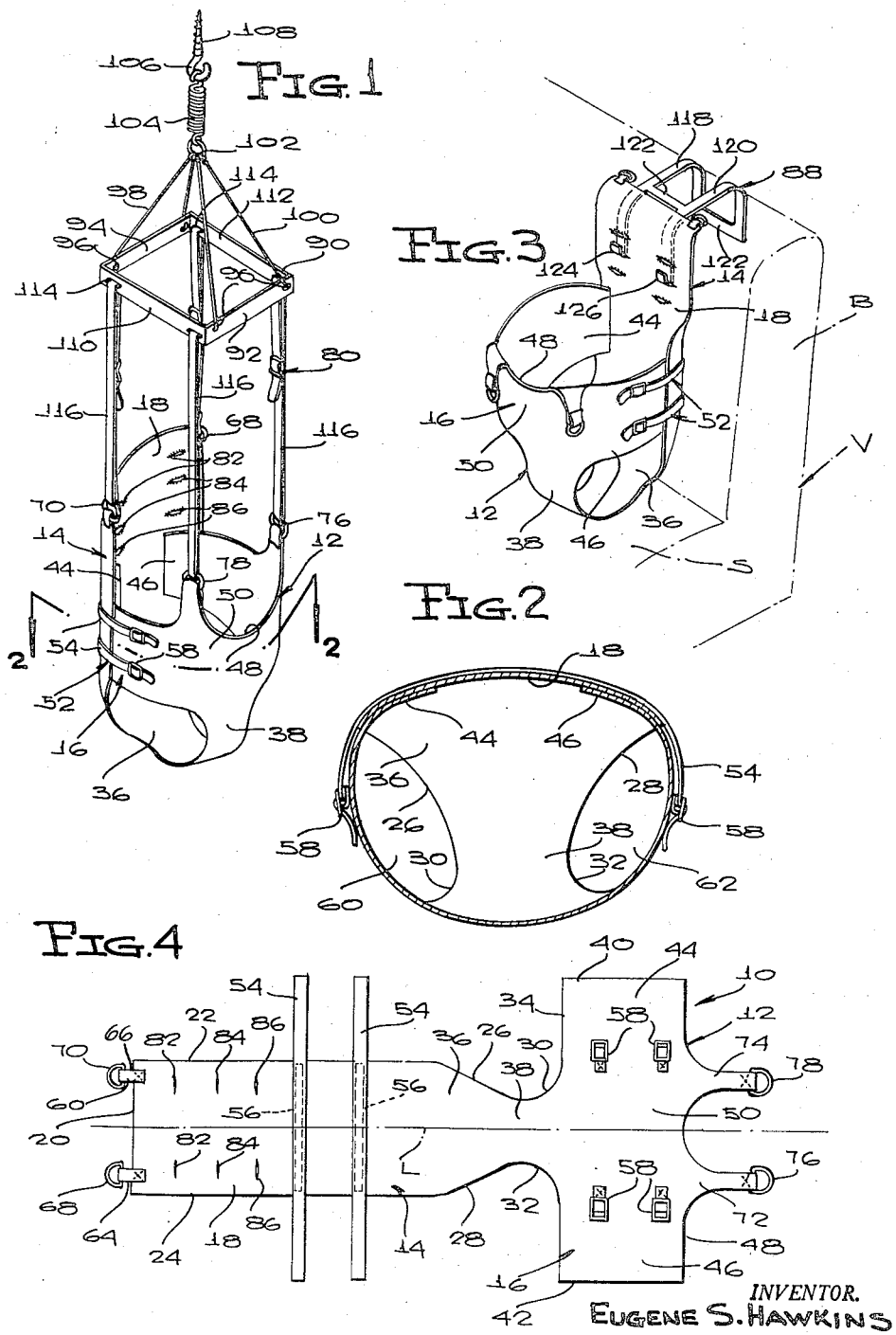

2,852,066

COMBINED CAR AND JUMPER SEAT FOR INFANTS

Eugene S. Hawkins, Ketchikan, Territory of Alaska

Application December 14, 1956, Serial No. 628,418

4 Claims. (Cl. 155—20)

This invention relates generally to an improved combined car and jumper seat for infants.

A primary object of invention is to provide an improved combined car and jumper seat including a harness for receiving an infant therein and including means for holding and supporting the infant in a substantially upright sitting position, said harness including means wherein the same may be readily removed from the infant and further including means whereby the harness may be readily supported from a jumper assembly or from means hanging said harness on the backrest of a vehicle seat or the like.

Another object of invention in conformance with that set forth is to provide a combined car and jumper seat of the character involved incorporating a substantially T-shaped harness member wherein the leg portion thereof defines a back, seat and crotch portion for an infant and a transverse head portion thereof provides chest and side portions for an infant, separable fastening means including cooperating portions on the back and side portions of the harness member for maintaining the same on the infant providing freedom of movement and comfort, said harness member incorporating means whereby the seat may be utilized with a jumper assembly affording free exercise of the infant, and further including means whereby the seat may be hung from the backrest of a vehicle seat or the like.

And yet a still further object of invention in conformance with that set forth is to provide an improved combined car and jumper seat of the character involved which is readily and economically manufactured, easily used, and highly safe and practical for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a perspective view of the combined car and jumper seat supported from a jumper assembly;

Figure 2 is a section taken substantially on the plane of line 2—2 of Figure 1;

Figure 3 is a perspective view of the combined car and jumper seat hung from a hanger utilized on the backrest portion of a vehicle seat shown by means of phantom lines; and Figure 4 is a plan view of the combined car and jumper seat.

Referring to the drawing in detail, and considering Figure 4 in particular, the combined car and jumper seat is indicated generally at 10 comprising a symmetrical T-shaped body member 12 including a leg 14 and transverse head 16. The body member may be constructed from any suitable material, canvas, plastic or the like, and will be disposed about an infant as a harness member as clearly seen in Figures 1 through 3.

The leg 14 has a substantially rectangular shape as indicated at 18 being substantially elongated and including a transverse terminal or upper edge 20 normal to side edges 22 and 24. The side edges 22 and 24 converge at an intermediate portion 26 and 28 toward the longitudinal axis of the leg 14, said longitudinal axis being indicated at L. The converging portions 26 and 28 continue in arcuate portions 30 and 32, respectively, merging into the transverse lower edge 34 of the head 12. The portion of the leg 14 between the converging edge portions 26 and 28 define a seat portion 36, and that portion of the leg between the arcuate portions 30 and 32 define a crotch portion 38. The rectangular portion 18 provides a back portion for an infant disposed in the seat.

The lower edge of the head 16 is normal to side edges 40 and 42 of said head, the terminal end portions 44 and 46 of said transverse head comprising side portions engageable on opposite sides of an infant utilizing the seat, the edge portions 40 and 42 terminating in a transverse upper edge 48 substantially parallel to the lower edge 34. A central portion 50 of the head 16 comprises a chest engaging portion juxtapositionable transversely of an infant's chest when disposed in the seat.

As clearly seen in Figures 1 through 3, the terminal ends 44 and 46 will extend transversely of respective side edge portions 22 and 24 of the rectangular member 18 adjacent the inner surface thereof i. e. the inner surface being the side of the body member 12 opposite that seen in Figure 4.

For the purpose of maintaining the body member or harness member in circumposed supporting relationship about the upper torso portion of an infant, detachable or separable fastening means indicated generally at 52 are provided, said fastening means being adjustable for the varying girths of different infants utilizing the seat. The fastening means 52 conveniently comprise flexible elongated straps 54 suitably secured in longitudinally extending transverse relationship relative to the leg 14 by means of stitching 56 or the like. Suitably secured in longitudinally spaced relationship on the head 16 are buckle elements 58 to which the ends of the flexible straps 54 are secured. As clearly seen in Figure 2, for example, portions 28 through 32 provide openings 60 and 62 through which the legs of an infant extend when the harness is suitably secured about the infant.

The leg 14 has extending in transverse spaced relationship equidistant from the longitudinal axis thereof suitably secured flexible loop elements 64 and 66 which have retained therein connecting ring elements 68 and 70, respectively. The head 16 has extending longitudinally from its edge 48 integral strap portions 72 and 74 having loop portions formed on their ends to which are secured connecting rings 76 and 78, respectively. The rings 68 and 76, and rings 70 and 78 are in longitudinal alignment for equalizing the distribution of the weight of an infant when disposed in the seat when the seat is utilized with a jumper assembly indicated generally at 80, see Figure 1.

The leg 14 has extending therethrough between the straps 54 and the terminal edge 20 thereof longitudinally spaced pairs of reinforced aperture or slot portions 82, 84 and 86, which are inwardly disposed relative to the edges 22 and 24 of the leg 14. The slot portions 82 through 86 provide means for engagement with legs of a hanger member indicated generally at 88 when the seat is utilized as a car seat. Different pairs of apertures 82 through 86 provide means for adjusting the relative height of the infant with respect to the seat portion S of a vehicle seat indicated generally at V, said vehicle seat incorporating a vertically extending back rest portion B.

Thus by loosening the straps 54 from the buckle elements 58 when the seat is used as a jumper seat or car seat will permit the ready removal of an infant from the seat without necessitating the removal or detachment of the jumper assembly 80 in any manner, or removing the hanger member 88 from the back rest portion of the vehicle seat. When not in use, the body member 12 may be readily folded and stored.

The jumper assembly 80 comprises a rectangular support frame 90 and extending through opposite sides 92 and 94 are apertures 96 adjacent each of the corners of the frame which have secured therein one end of flexible support elements 98 and 100 which extend in converging relationship through a support ring 102. The support ring 102 is suitably secured to the lower end of a tension spring 104, the other end of said spring being received on a suitable hook element 104 having a threaded upper end portion 108 to be secured in any suitable horizontal support member. The sides 110 and 112 of the frame 90 have extending transversely therethrough adjacent the corners of said frame suitable slot portions 114 through which extend intermediate portions of flexible and adjustable support straps 116 one of each extending through the connecting rings 68, 70, 76 and 78.

The hanger member 88 is constructed of any suitable material, including U-shaped legs 118 and 120 integral with a pair of transverse brace portions 122. Terminal ends of the legs 118 and 120 including an upwardly extending hook end portion 124 and 126, respectively which are received within one of the pairs of slots or reinforced apertures 82, 84 or 86.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. In a combined car and jumper seat, a T-shaped flexible sheet having a standard portion and a crosshead, said standard portion being substantially narrower throughout its length than said crosshead and having an upper edge remote from said crosshead, and said crosshead having an upper edge remote from said standard portion, said crosshead comprising arms projecting laterally outwardly beyond the side edges of said standard portion, said arms being engaged with a side of said standard portion inwardly of the side edges of the standard portion, strap means extending crosswise of and secured to an intermediate part of said standard portion, the part of said standard portion outwardly of said strap means being a back-engaging portion, and the part of said standard portion inwardly of said strap means being a crotch-engaging portion, said strap means having free ends reaching laterally outwardly beyond the side edges of the standard portion, and laterally outwardly facing buckle means on the crosshead arms with which the free ends of the strap means are securably engaged, and first suspension means on said standard portion between said strap means and said upper edge of the standard portion.

2. In a combined car and jumper seat, a T-shaped flexible sheet having a standard portion and a crosshead, said standard portion being substantially narrower throughout its length than said crosshead and having an upper edge remote from said crosshead, and said crosshead having an upper edge remote from said standard portion, said crosshead comprising arms projecting laterally outwardly beyond the side edges of said standard portion, said arms being engaged with a side of said standard portion inwardly of the side edges of the standard portion, strap means extending crosswise of and secured to an intermediate part of said standard portion, the part of said standard portion outwardly of said strap means being a back-engaging portion, and the part of said standard portion inwardly of said strap means being a crotch-engaging portion, said strap means having free ends reaching laterally outwardly beyond the side edges of the standard portion, and laterally outwardly facing buckle means on the crosshead arms with which the free ends of the strap means are securably engaged, and first suspension means on said standard portion between said strap means and said upper edge of the standard portion, said crosshead arms being engaged with the inward side of the standard portion and said strap means being on the outer side of said standard portion.

3. In a combined car and jumper seat, a T-shaped flexible sheet having a standard portion and a crosshead, said standard portion being substantially narrower throughout its length than said crosshead and having an upper edge remote from said crosshead, and said crosshead having an upper edge remote from said standard portion, said crosshead comprising arms projecting laterally outwardly beyond the side edges of said standard portion, said arms being engaged with a side of said standard portion inwardly of the side edges of the standard portion, strap means extending crosswise of and secured to an intermediate part of said standard portion, the part of said standard portion outwardly of said strap means being a back-engaging portion, and the part of said standard portion inwardly of said strap means being a crotch-engaging portion, said strap means having free ends reaching laterally outwardly beyond the side edges of the standard portion, and laterally outwardly facing buckle means on the crosshead arms with which the free ends of the strap means are securably engaged, and first suspension means on said standard portion between said strap means and said upper edge of the standard portion, second suspension means on said upper edge of the crosshead, and suspending means having portions supportably engaged with said first and second suspension means.

4. In a combined car and jumper seat, a T-shaped flexible sheet having a standard portion and a crosshead, said standard portion being substantially narrower throughout its length than said crosshead and having an upper edge remote from said crosshead, and said crosshead having an upper edge remote from said standard portion, said crosshead comprising arms projecting laterally outwardly beyond the side edges of said standard portion, said arms being engaged with a side of said standard portion inwardly of the side edges of the standard portion, strap means extending crosswise of and secured to an intermediate part of said standard portion, the part of said standard portion outwardly of said strap means being a back-engaging portion, and the part of said standard portion inwardly of said strap means being a crotch-engaging portion, said strap means having free ends reaching laterally outwardly beyond the side edges of the standard portion, and laterally outwardly facing buckle means on the crosshead arms with which the free ends of the strap means are securably engaged, and first suspension means on said standard portion between said strap means and said upper edge of the standard portion, said first suspension means comprising pairs of laterally spaced slots spaced along said back-engaging portion, and a hanger comprising inverted U-shaped arm means for engagement over a support, said U-shaped arm means including legs having upwardly opening hooks selectively engaged through a pair of said slots.

References Cited in the file of this patent

UNITED STATES PATENTS

| | | |
|---|---|---|
| D. 140,503 | Geluso | Mar. 6, 1945 |
| 450,394 | Billeaux | Apr. 14, 1891 |
| 803,427 | Monroe | Oct. 31, 1905 |
| 921,057 | Ayers | May 11, 1909 |
| 1,089,276 | Seeger | Mar. 3, 1914 |
| 2,008,689 | Donahoe | July 23, 1935 |